Figure 1:
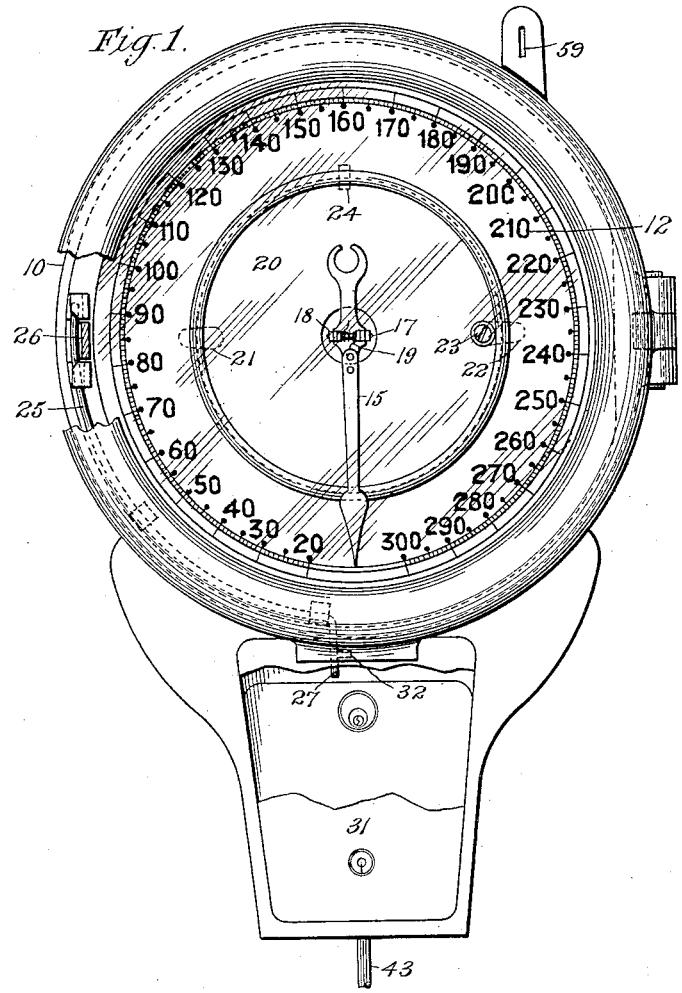

W. W. ROSENFIELD.
WEIGHING MACHINE.
APPLICATION FILED NOV. 9, 1909.

1,173,309.

Patented Feb. 29, 1916.
4 SHEETS—SHEET 1.

Witnesses:
S. E. Brown
P. N. Tilden

Inventor:
William W. Rosenfield
by his Atty's:
Philipp Sawyer Rice Kennedy

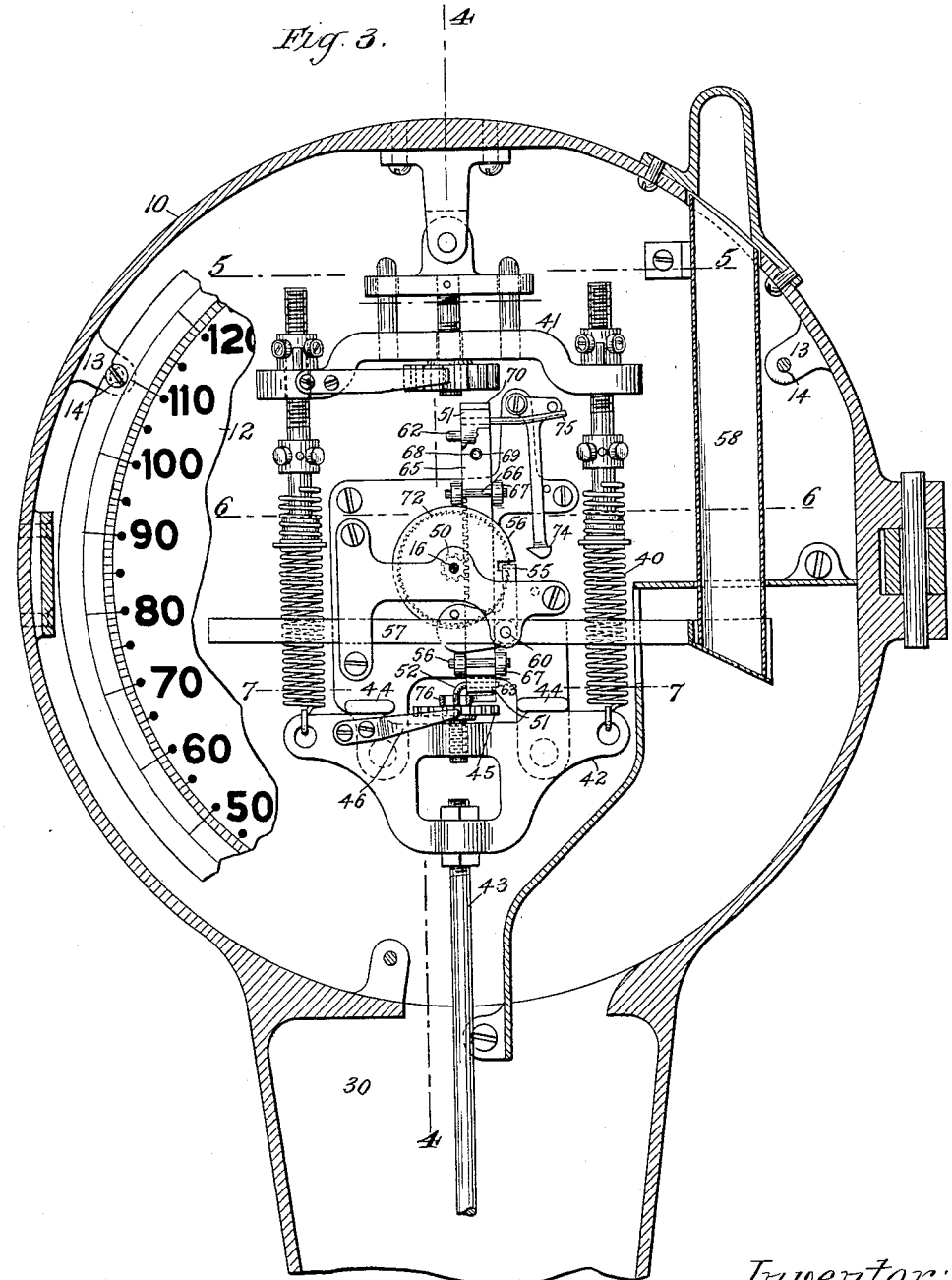

W. W. ROSENFIELD.
WEIGHING MACHINE.
APPLICATION FILED NOV. 9, 1909.
1,173,309.
Patented Feb. 29, 1916.
4 SHEETS—SHEET 3.
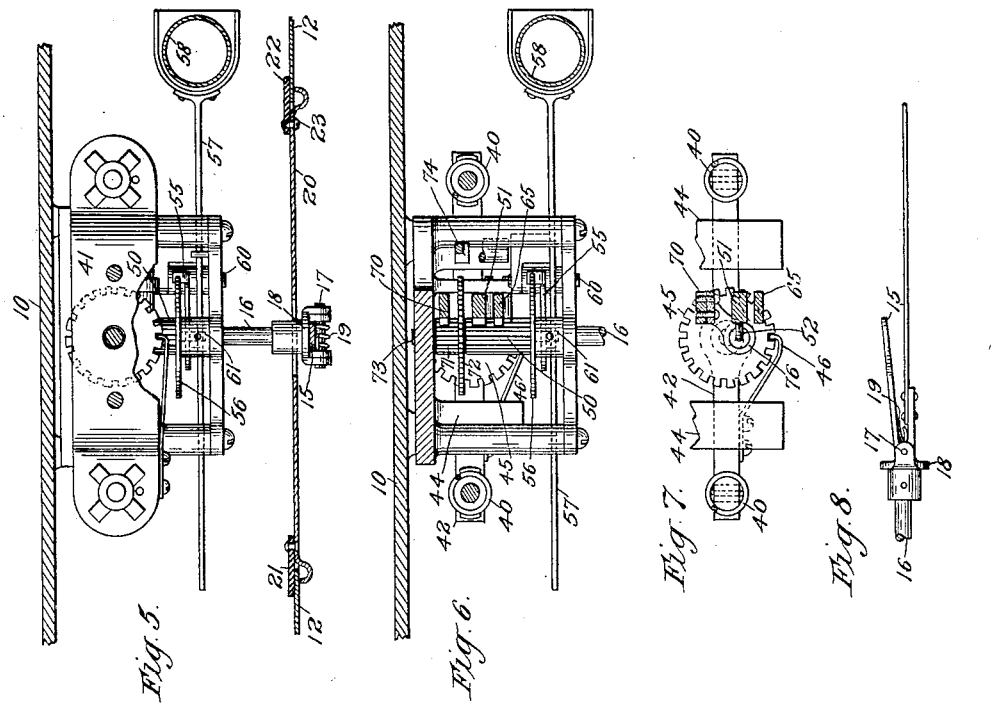
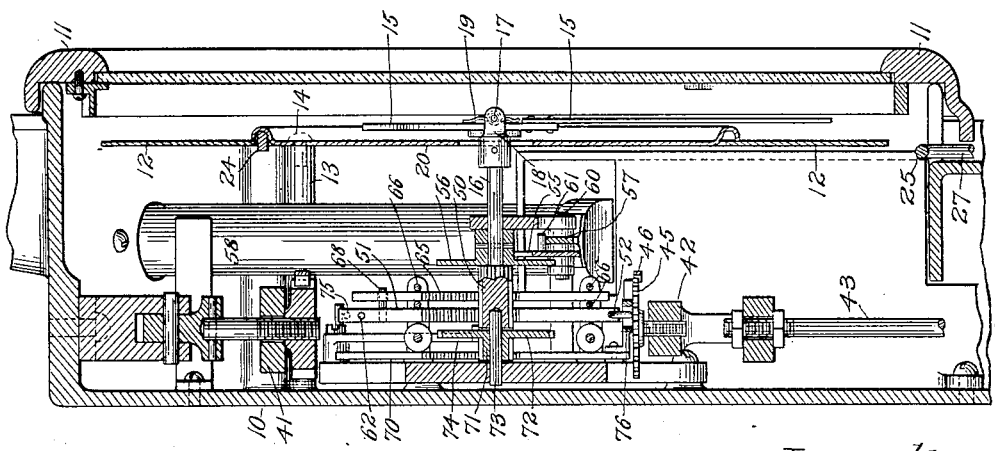
Witnesses:
S. E. Brown
P. N. Tilden
Inventor:
William W. Rosenfield
by his Atty's:
Philipp Sawyer Rice Kennedy W. W. ROSENFIELD.
WEIGHING MACHINE.
APPLICATION FILED NOV. 9, 1909.
1,173,309.
Patented Feb. 29, 1916.
4 SHEETS—SHEET 4.
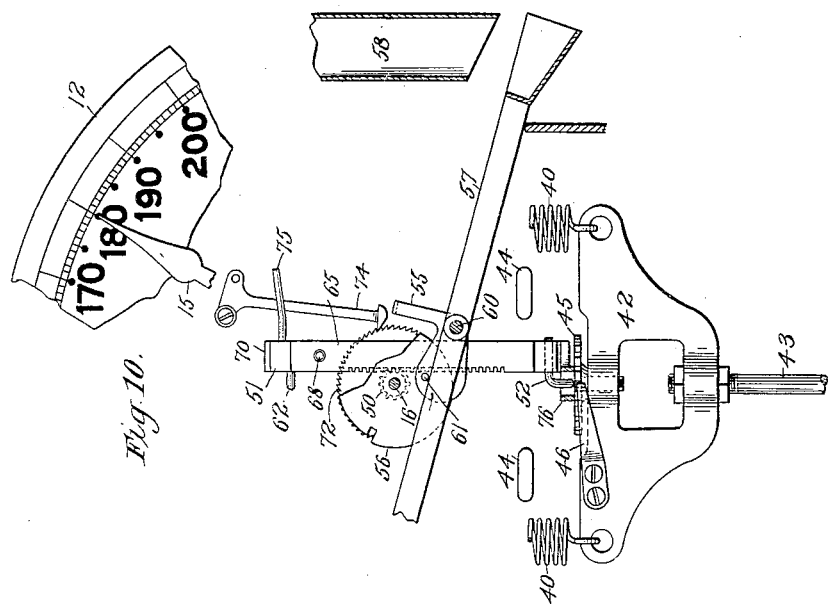
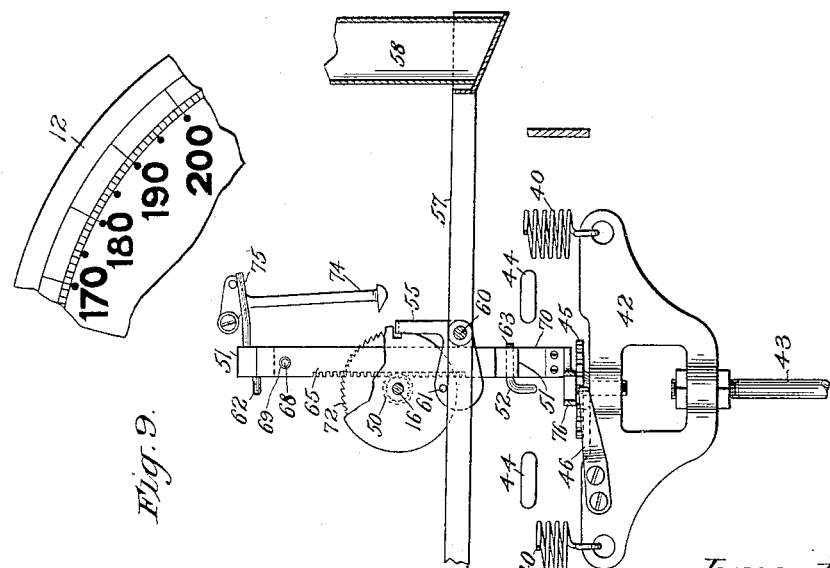

UNITED STATES PATENT OFFICE.

WILLIAM W. ROSENFIELD, OF NEW YORK, N. Y., ASSIGNOR TO ROSENFIELD MANUFACTURING COMPANY, A CORPORATION OF NEW YORK.

WEIGHING-MACHINE.

1,173,309.      Specification of Letters Patent.      Patented Feb. 29, 1916.

Original application filed January 9, 1907, Serial No. 351,420. Divided and this application filed November 9, 1909. Serial No. 526,984.

*To all whom it may concern:*

Be it known that I, WILLIAM W. ROSENFIELD, a citizen of the United States, residing at New York city, county of New York, and State of New York, have invented certain new and useful Improvements in Weighing-Machines, fully described and represented in the following specification and the accompanying drawings, forming a part of the same.

This application is a division of application No. 351,420, filed January 9th, 1907, for improvements in weighing machines, and the invention to which this application relates comprises certain features of construction and combination of parts especially adapted to weighing machines.

The invention has been made with the object of providing an improved weighing machine of that class in which the indicating means is normally locked or held against operation and is operable only on the performance of some act, such as the insertion of a coin or check, but features of the invention may be found useful and may be employed in other weighing machines and in machines other than weighing machines.

A full understanding of the invention can best be given by a detail description of a coin operated weighing machine of preferred form embodying the various features of the invention, and such a description will now be given in connection with the accompanying drawings showing the machine shown in my said application No. 351,420. The platform and the platform levers and their casing and the standard extending upward therefrom and not shown in the drawings as these parts may be of any suitable construction.

Figure 2:
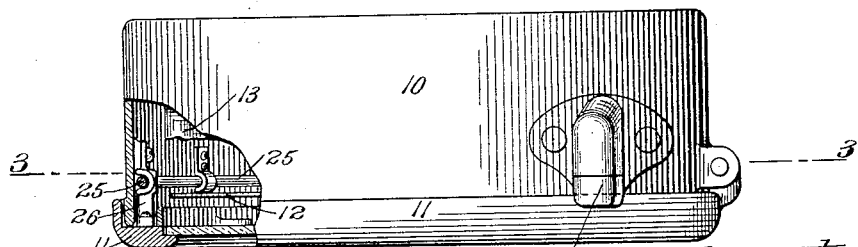

In the drawings:—Figure 1 is a face view partly broken away of the upper or head portion of the weighing machine showing the dial and the index or pointer for indicating the weight by pointing to the corresponding number on the dial scale. Fig. 2 is a plan view partly broken away of the head of the weighing machine. Fig. 3 is an enlarged sectional view on line 3 of Fig. 2. Fig. 4 is a vertical section on line 4 of Fig. 3. Figs. 5, 6 and 7 are horizontal detail sectional views on lines 5, 6 and 7 respectively, of Fig. 3. Fig. 8 is a detail view of the index or pointer and the end of the spindle by which it is carried, showing the parts of the index or pointer in their folded position. Fig. 9 is a front view of the operative parts shown in Fig. 3, showing the parts in position when a weight is on the scale platform but before the indicating mechanism has been released. Fig. 10 is a similar view, but showing the parts in position just after the coin has been deposited and the index or pointer has been moved to indicate the weight of the person or thing being weighed.

Referring to the drawings, 10 represents the head casing which contains the weighing springs and connections and the indicating mechanism and other operating parts, and which is preferably of circular form and formed with solid sides and back and with a hinged front 11 formed of a glass plate carried by a circular frame or ring. The dial plate 12 is supported behind the glass front on lugs 13 extending from the sides of the casing, being removably secured to such lugs as by means of screws 14. When the hinged front of the casing is open, the dial plate may thus be removed so as to expose all the working parts located within the casing.

In order to permit of the ready removal of the dial plate without necessitating the removal of the index or pointer 15 from the spindle 16 by which it is carried and which extends through a central opening in the dial, the index or pointer is formed of two sections which are pivoted on a pin 17 carried by lugs extending from a cap 18 on the end of the spindle 16 and are normally held in their extended position as shown in Figs. 1 and 4 by means of a small spring 19, and which may be turned or folded together against the tension of such spring 19 to the position shown in Fig. 8. When the pointer is folded in this position the dial plate having been freed by the removal of the screws 14, may be readily removed by simply moving the same outward over the folded pointer. The central portion of the dial plate is preferably formed of a separate plate 20, which may be removed without disturbing the outer or main portion of the dial plate. This central part or plate 20 may be removably secured to the main portion of the dial plate in any suitable manner, as by being formed as shown to overlap the inner edges of the main portion of the dial plate, and being provided with oppositely arranged catches 21 and 22 for extending behind the edge of the main portion of the dial plate, the catch 22 being arranged to be turned, as by means of a screw head 23 so as to release the plate 20 at one side and thereby permit that side of the plate to be drawn forward and the plate then to be moved slightly edgewise to draw the other catch 21 from behind the edge of the main portion of the dial plate. The central plate 20 is also preferably provided with a positioning lug 24 adapted to extend into a suitably located notch in the inner edge of the main portion of the dial plate. Obviously the central plate 20 may be left off entirely if desired so as to expose to view the working parts within the head casing.

The hinged front 11 is preferably hinged at one side of the casing as shown, and is secured in its closed position by means of a locking bolt 25 which engages a lug 26 extending from the opposite side of the frame of the pivoted front within the casing when the front is in its closed position. The bolt 25 is curved to correspond with the curvature of the side of the casing and extends downward within the casing and is provided with a bent end 27 which extends down into the upper part of a chamber 30 formed in a downwardly extending neck of the head casing 10. This portion of the chamber 30 is closed by means of a cover plate 31 provided with a suitable lock so that when this cover plate is locked in position the end 27 of the bolt 28 cannot be reached for unlocking the hinged cover 11. To insure against accidental displacement of the bolt 25, the cover plate 31 is provided with an inwardly extending lug 32 which when the plate is in position projects into the path of the end 27 of the bolt and prevents withdrawing movement of the bolt until the plate 31 is removed.

Referring now to the operating devices, the weighing springs 40 are supported from a cross-bar 41 and are connected at their lower ends to a cross-head 42 to which is connected the draft rod 43 which extends downward through the chamber 30 and through the supporting column to the platform levers, not shown, of the scale. The weighing springs are connected to the supporting bar 41 by means providing for independently adjusting the tension of the springs, and the supporting bar is hung from the top of the casing by means providing for vertical adjustment of the same, as usual. When there is no weight on the platform, the cross-head 42 is held by the springs 40 in its normal position as shown in Fig. 3 against stops 44. The cross-head 42 carries a horizontal vertically adjustable plate or disk 45 which acts as a stop for limiting the downward movement of a vertically sliding rack bar for operating the index or pointer, and another vertically sliding rack bar, which will be hereinafter described. This stop plate or disk is preferably carried by a screw stem so that by turning the disk it may be raised or lowered relatively to the cross-head as desired. A spring catch 46 serves to hold the disk in its adjusted position by engaging peripheral notches therein.

The indicator spindle 16 carries fast thereon a pinion 50, which is engaged by a rack bar 51 which is mounted to slide vertically between suitable guides, the lower end of which rack bar is provided with a pin 52 adapted to engage the stop plate 45 by which the downward movement of the rack bar is limited. The downward movement of the rack bar serves to turn the pinion 50 and indicator spindle 16 and thereby swing the end of the index or pointer 15 over the scale of the dial plate. When the crosshead 42 has been drawn downward against the tension of the springs 40 by the weight of a person or thing on the scale platform and the rack bar 51 is allowed to move downward under the influence of gravity until it is stopped by the engagement of its pin 52 with the stop plate 45, the index 15 will then show on the dial scale the weight of the person or thing on the platform.

The downward movement of the indicator rack and rotation of the spindle 16 is normally prevented by a gravity catch 55 mounted to engage a notch in a disk 56 fast on the spindle 16. The position of the catch 55 and the notch in the periphery of the disk 56 are such that when the catch is in the notch the index or pointer 15 will be held at the 0 position. The catch 55 is intended to be released in the construction shown by the insertion of a coin, and for this purpose a coin lever 57 is provided, one end of which extends beneath the open end of a coin chute 58 which is open to the coin slot 59 located at the upper part of the casing, and which lever is balanced so that it will normally rest in the position shown in Figs. 3 and 9. The lever 57 and the catch 55 are pivoted on a pin 60, and the weighted end of the catch is provided with a pin 61 in position to be engaged by the coin lever, so that when the latter is tilted to the position shown in Fig. 10, the catch will be thrown out of engagement with the disk 56. When a coin is deposited in the slot 59 it drops through the coin chute and hits the end of the lever 57 causing it to move to the position shown in Fig. 10, thereby throwing the catch out of engagement with the disk 56 and releasing the spindle 16 to permit the same to rotate and the rack bar 51 to move downward until stopped by the plate 45. When the coin lever has been moved to the position shown in Fig. 10, the coin will drop off from the end thereof and the lever will then return to its normal position so as to permit the gravity catch 55 to return to position to engage the notched edge of the disk 56 when the spindle is rotated backward to carry the index back to 0 position by the upward movement of the rack bar when the weight is removed from the scale platform and the cross-head 42 allowed to return to its normal position as shown in Fig. 3. The catch 55 is preferably pivoted and balanced independently of the coin lever, as shown, so as to provide for a quicker action of the catch than would be possible if it were rigidly connected with or formed as a part of the coin lever, since the amount of over-balancing of the coin lever is limited to what will be readily overcome by the weight and momentum of the coin.

In order to avoid lost motion between the teeth of the indicator rack and the teeth of the pinion 50 and insure the rack teeth always engaging the same side of the teeth of the pinion when the rack is supported by the stop plate 45, a second rack 65 is provided mounted to move vertically and in engagement with the pinion 50. This rack is at all times supported solely by the teeth of the pinion and thereby acts to take up all lost motion between the indicator rack and the pinion whenever and in whatever position the indicator rack is supported by the stop plate 45. This rack 65 thus avoids the necessity of providing a spring for placing the indicator spindle under tension.

The racks 51 and 65 are guided by means of upper and lower pins 66 carried by upper and lower pairs of lugs 67 and removable so as to permit the racks to be readily removed and replaced. In order to insure the racks being always replaced in proper relative position, one of the racks, as 51, is provided with a pin 68 which extends through an opening 69 in the other rack, which opening is slightly larger than the pin so that while the racks will be entirely free from each other when in position, the insertion of the pin in the opening will serve to secure the proper relative position of the racks to each other when placed in engagement with the pinion.

If the rack bar 51 were allowed to move downward a sufficient distance to cause a complete rotation of the disk 56, the disk would after making such rotation become locked by the catch 55 and the spindle and index would be prevented from returning to normal position. A stop is therefore provided to prevent further forward rotation of the spindle and downward movement of the rack bar 51 before the spindle and disk has made a complete rotation, that is, when the index has been swung around to the position indicating three hundred pounds on the dial scale as shown. Such stop is formed as shown by a pin 62 projecting from the rack bar 51 in position to engage one of the upper lugs 67 and thereby prevent farther downward movement of the rack bar when the index has reached the three hundred pounds mark on the index scale. A stop is also provided for limiting the upward movement of the rack bar 51 on the return of the cross-head 42 to normal position. When the weight is suddenly removed from the scale platform, the cross-head returns to its normal position against the stops 44 with considerable force, and a stop is therefore provided to limit the upward movement of the rack bar 51 and corresponding movement of the parts with which it is connected. As shown, the end 63 of the pin 52 projects from the rack bar 51 below one of the lower lugs 67 and is adapted to engage such lug when the rack bar is thrown a short distance above its normal position.

For the purpose of preventing repeated weighing operations after the insertion of a single coin, means are provided whereby when the cross-head 42 has been brought to balancing position by a person or thing on the scale platform and the pointer has been allowed to move to indicating position by the insertion of a coin, any further forward movement of the pointer from such indicating position or from any intermediate position to which it has been returned, will be prevented. For this purpose a third rack bar 70 is provided, mounted to move vertically in suitable guides and limited in its downward movement by the stop plate 45 and engaging a pinion 71 carried by a disk 72 mounted to rotate independently of the spindle 16 on a pin 73, which pin, as shown, forms the bearing for one end of the spindle 16. This disk 72 is provided with ratchet teeth on its periphery pointing in the direction in which the disk is rotated by the downward movement of the rack bar 70. A pawl 74 is mounted in position to engage the teeth of the disk 72 and tends to move into engagement therewith but is normally held clear of the disk by means of a pin 75 projecting from the upper end of the rack bar 51. When the cross-head 42 moves downward, therefore, the rack bar 70 will move downward with it and will cause a corresponding rotation of the disk 72. When a coin is inserted, however, to release the indicator spindle and the indicator rack 51 starts on its downward movement, the pin 75 frees the pawl 74 and permits it to move into engagement with the toothed periphery of the disk 72, thereby preventing any further downward movement of the rack bar 70, or at least any movement greater than that corresponding to the space between the engaging edge of the pawl 74 and the tooth of the disk directly above it. The lower end of the rack bar 70 is provided with an offset 76, which extends beneath the lower end of the rack bar 51, and the lower end of the rack bar 51 lies close to, but not in engagement with the offset 76 when both rack bars are supported by the stop plate 45, so that if, after the indication of the weight of the person or thing on the platform has been given, the cross-head 42 is caused to move further downward by additional weight on the platform, further downward movement of the rack bar 51 and a corresponding movement of the pointer will be prevented by the engagement of the end of the rack bar 51 with the offset 76 of the rack bar 70. Similarly if after an indication of weight has been obtained, the cross-head 42 is by a change of weight allowed to return partway and then caused to move downward again, the rack bar 51 and the pointer will remain about in the position to which they have been returned by the upward movement of the cross-head. It is desirable that the racks 51 and 70 should bear centrally on the stop plate 45, and for this purpose the offset 76 is preferably formed, as shown, to engage centrally of the plate and is formed with an opening through which the pin 52 of the rack bar 51 engages the plate.

The operation of the weighing machine is briefly as follows:—The parts normally rest in the position shown in Figs. 3, 4, 5 and 6, the indicator rack and spindle being locked against movement by the gravity catch 55, and the cross-head 42 and connected parts being free to move under the influence of a weight on the scale platform, and the rack bar 70 being free to move forward, that is, downward in the vertically arranged machine shown, when permitted so to move by, and for a distance corresponding to, the downward or forward movement of the cross-head 42 and the stop plate 45. When a person steps on the scale platform, or a thing to be weighed is placed on the scale platform, the cross-head 42 is drawn downward and comes to rest in a position corresponding to the weight of the person or thing being weighed, and the rack bar 70 being supported by the plate 45 moves downward or forward a corresponding distance, thereby rotating the toothed disk 72. A coin being then inserted in the coin slot, drops through the coin chute and strikes the end of the coin lever 57 and tilts the same to the position shown in Fig. 10 thereby moving the catch 55 out of engagement with the disk 56 to release the indicator spindle and rack bar, whereupon the indicator rack bar and the rack bar 65 move downward or forward until stopped by the pin 52 coming into engagement with the stop plate 45. The indicator spindle is thereby turned to swing the index or pointer 15 into position to indicate on the dial scale the weight of the person or thing being weighed. As the indicator rack starts to move downward, the pin 75 carried thereby moves out of engagement with the pawl 74, which pawl being thus released swings into engagement with the toothed periphery of the disk 72, thereby locking the rack bar 70 against further downward movement. This rack bar being thus locked against downward movement, any subsequent further downward movement of the cross-head under the influence of additional weight on the scale platform will not be indicated by a corresponding movement of the index or pointer, since the offset 76 of the rack bar 70 will then prevent further downward movement of the indicator rack bar 51 to correspond with such further downward movement of the cross-head. As the rack bar 70 is locked only against downward movement by the engagement of the pawl 74 with the toothed disk 72, it is at all times free to be moved upward again and does not interfere with upward movement of the cross-head 42 from any position to which it has been accompanied by the rack bar 70 in its downward movement. If, however, the cross-head moves upward partway from the position of balance which it had at the time the coin was inserted and then is moved downward again, the rack bar 70 will be held from making a second corresponding downward movement and will in turn prevent a downward movement of the indicator rack bar. It will be impossible, therefore, to beat the weighing machine and obtain the weight of two persons or articles in succession for the insertion of a single coin, or after the indicating mechanism has been otherwise released, by placing a second person or article on the platform after the weight of the first person or article has been obtained, or by changing the weight on the platform so as to allow the index to move partway back with the intention of then causing it to move forward again over the dial scale. When the weight is removed from the platform, the cross-head returns to its normal position against the stops 44, thereby raising the rack bars and returning the index or pointer to 0 position. When the indicator spindle has been turned by the upward movement of the rack bar to bring the index or pointer back to 0 position, the notch in the periphery of the disk 56 will be again brought to position opposite the catch 55 and the end of the catch will then enter the notch to lock the indicator mechanism against operation until another coin is inserted. As the indicator rack reaches the end of its upward movement, its pin 75 will again engage the pawl 74 and move the same out of engagement with the disk 72 thereby unlocking the rack bar 70 and leaving it free to move downward when permitted so to move by any downward movement of the cross-head 42.

It will be noticed that the disk 56 and the index or pointer 15 are both rigidly connected to the spindle 16 so that whenever the spindle is locked by the catch 55 projecting into the notch of the disk 56, the index will point to the 0 mark of the scale. The tension of the weighing springs is preferably adjusted so that when the cross-head is raised against the stops 44 the springs will be under some tension so as to hold the cross-head close against the stops. A tension of the springs corresponding to a weight of ten pounds on the scale platform is found desirable, and the mechanism is shown as intended to be adjusted for such tension of the springs, the scale on the dial being arranged so that the first movement of the index or pointer from the 0 position for a distance corresponding to an increase of ten pounds weight on the scale platform will bring the pointer to the twenty pound point on the dial scale, that is, any weight on the platform up to ten pounds will not cause any movement of the index, but a twenty pound weight on the platform will cause the index to move to indicate twenty pounds on the dial scale.

It will be understood that the invention is not to be limited to the exact construction, arrangement and combination of parts, as shown, but that it includes changes and modifications thereof within the claims.

Features of invention embodied in the machine shown and not claimed herein are claimed in my said application No. 351,420, of which this application is a division.

What is claimed is:—

1. In a weighing machine, the combination of spring weighing mechanism comprising weighing springs normally under tension, a member suspended by the weighing springs, and stops for said member against which said member is held by the weighing springs when in normal position, and an indicating mechanism comprising a movable member normally locked against movement and adapted when released to be limited in its movement by the position of said member of the weighing mechanism, and means for normally locking the movable member against movement.

2. In a weighing machine, the combination of spring weighing mechanism comprising weighing springs normally under tension, a member suspended by the weighing springs, and stops for said member against which said member is held by the weighing springs when in normal position, and an indicating mechanism comprising a movable member normally locked against movement and adapted when released to be limited in its movement by the position of said member of the weighing mechanism and means for normally locking the movable member against movement; and an adjustable member interposed between said movable member and said member of the weighing mechanism.

3. The combination of indicating means, a pinion connected therewith, a sliding rack bar for engaging the pinion to control the movement of the indicating means, and a second sliding rack bar for engaging the pinion and constantly bearing thereon in one direction to take up lost motion between the pinion and the first rack bar, said rack bars being removable and one of said rack bars being provided with a pin extending into an opening in the other of said rack bars, said pin and opening being of such relative size that the pin will not be in engagement with the walls of the opening when the rack bars are both in engagement with the pinion but will hold the bars in such relation when not in engagement with the pinion that when brought into engagement with the pinion they will have a proper relative position.

4. An indicating means comprising a dial plate, a spindle extending through an opening in the dial plate, and an index or pointer carried by the spindle and formed of two parts pivotally connected to the spindle and adapted to be turned outwardly to permit of the removal of the dial plate.

5. An indicating means comprising a dial plate, a spindle extending through an opening in the dial plate, and an index or pointer carried by the spindle and formed of two parts pivotally connected to the spindle and adapted to be turned outwardly to permit of the removal of the dial plate, said parts of the index being normally spring held in position.

6. In a weighing machine, the combination of a casing, weighing and indicating mechanism mounted within the casing, and a dial plate comprising an outer portion provided with the dial scale and formed with a central opening, and a removable central portion substantially closing said central opening of the outer portion of the dial plate when in position.

In testimony whereof, I have hereunto set my hand, in the presence of two subscribing witnesses.

WILLIAM W. ROSENFIELD.

Witnesses:
 T. F. KEHOE,
 W. H. KENNEDY.